US010097523B2

(12) United States Patent
Kuker et al.

(10) Patent No.: US 10,097,523 B2
(45) Date of Patent: Oct. 9, 2018

(54) METHOD AND SYSTEM FOR PROVIDING SECURE REMOTE EXTERNAL CLIENT ACCESS TO DEVICE OR SERVICE ON A REMOTE NETWORK

(75) Inventors: Bill Kuker, Dover, NH (US); Ryan Tenney, Saxtons River, VT (US); Clement Tse, Vancouver (CA)

(73) Assignee: Martello Technologies Corporation, Ottawa (CA)

( * ) Notice: Subject to any disclaimer, the term of this patent is extended or adjusted under 35 U.S.C. 154(b) by 876 days.

(21) Appl. No.: 14/375,504

(22) PCT Filed: Jan. 30, 2012

(86) PCT No.: PCT/CA2012/000074
§ 371 (c)(1),
(2), (4) Date: Dec. 16, 2014

(87) PCT Pub. No.: WO2013/020207
PCT Pub. Date: Feb. 14, 2013

(65) Prior Publication Data
US 2015/0150114 A1    May 28, 2015

(51) Int. Cl.
*G06F 21/00* (2013.01)
*H04L 29/06* (2006.01)
*H04L 12/46* (2006.01)

(52) U.S. Cl.
CPC ...... *H04L 63/0478* (2013.01); *H04L 12/4641* (2013.01); *H04L 63/0471* (2013.01); *H04L 63/164* (2013.01); *H04L 63/166* (2013.01); *H04L 63/0272* (2013.01)

(58) Field of Classification Search
CPC .................. H04L 63/0478; H04L 12/4641
USPC ............................................. 726/14
See application file for complete search history.

(56) References Cited

U.S. PATENT DOCUMENTS

| | | | |
|---|---|---|---|
| 2005/0144474 A1* | 6/2005 | Takala | H04L 63/083 726/27 |
| 2006/0224946 A1* | 10/2006 | Barrett | G06F 17/246 715/210 |
| 2007/0124451 A1* | 5/2007 | Joshi | H04L 12/2602 709/223 |
| 2010/0262645 A1* | 10/2010 | Brown | G06F 21/10 709/203 |

* cited by examiner

*Primary Examiner* — Anthony Brown
(74) *Attorney, Agent, or Firm* — Rosenberg, Klein & Lee (57) ABSTRACT

In order to provide secure user access to a device or service on a remote network, upon receipt of a request to access the device or service on a portal on a central server, a request is sent to a probe application installed on the remote network to establish a secure link to the central server. A message is then sent to the user directing the user to initiate a specific session request to the central server. The session request is cross connected to the probe application installed on the remote network over the secure link to establish a secure tunnel to the probe application. A secure user session is set up through the secure tunnel to the device or service via the probe application.

18 Claims, 6 Drawing Sheets

METHOD AND SYSTEM FOR PROVIDING SECURE REMOTE EXTERNAL CLIENT ACCESS TO DEVICE OR SERVICE ON A REMOTE NETWORK

FIELD OF THE INVENTION

This invention relates to the field of networking, and in particular to a method and system for providing secure external client access to a device or service on a remote network.

BACKGROUND OF THE INVENTION

Users often require secure access to remote networks. For example, travelling sales personnel or teleworkers might require remote access to their office networks. Traditionally such access has been provided using virtual private networks (VPNs). However, only one VPN session can be run at one time, and VPN clients do not work with other VPN servers.

Managing network systems and equipment is also getting more and more complicated with the growing addition of many types of systems and services to the network. Voice services, a real-time critical system, have now migrated into this area as well, bringing all the complexity that goes along with them. Trying to manage a network externally is a major problem, especially from a security standpoint, as typically networks can only be managed locally within the network.

SUMMARY OF THE INVENTION

The invention makes use of cloud computing technology to provide the high availability, scalability, and performance required for remote network monitoring and management without the use of a VPN.

Accordingly the present invention a method of providing secure user access to a device or service on a remote network, comprising receiving a request to access the device or service on a portal on a central server; sending a request to a probe application installed on the remote network to establish a secure link to the central server; sending a message to the user directing the user to initiate a specific session request to the central server; cross connecting the session request to the probe application installed on the remote network over the secure link to establish a secure tunnel to the probe application; and forwarding a user session through the secure tunnel to the device or service via the probe application.

Embodiments of the invention make use of a server initiated port forward and remote procedure call setup. Port forwarding typically is used to associate a private address within a network with an address, typically of a router or gateway, visible to the outside world. A router receiving an incoming message addressed to its external IP address translates the port number to a private IP address and port on the internal network.

Port forwarding must be configured from within the remote network due to security reasons. In accordance with an embodiment of the invention, the probe application effectively acts as a robot setting up port forwarding within the remote network at the request of the external central server.

The novel solution provides a highly flexible structure and offers multiple access levels to users. Administrator users are able to administer end user customer accounts and to access and modify customer network monitoring information. An Administrator user only has access to information for customers created and managed by their specific VAR. Customer user accounts have limited access and can only be created by an Administrator user to allow an end-customer to have access to their specific company's web portal.

There are two basic parts to the novel system:
1. A central server, which acts as a highly available and scalable-hosted computing platform. The central server manages communications to remote customer networks and maintains database of status and events, and provides a Web portal with access security. Additionally, the central server has a Remote Access capability that provides secure "cross-connect" for remote access to the customer network.
2. A probe application running on a server in the remote customer network. The probe application has several important functions. It initiates and maintains secure connections to the central server, collects performance data and alarms from devices in the Customer Networks, transfers performance data and alarms to the central server and enables secure remote access for the user from their location to the remote customer network. The probe application may conveniently be provided an a computer-readable medium, such as a CD ROM, or other storage device, or stored on a remotely accessible server.

In another aspect the invention provides a system for providing secure user access to a device or service on a remote network, comprising a central server providing a portal to receive a request to access the device or service and configured to send a request to a probe application installed on the remote network to establish a secure link to the central server; send a message to the user directing the user to initiate a specific session to the central server; cross connect the session request to the probe application installed on the remote network over the secure link to establish a secure tunnel to the probe application; and forward a secure session through the secure tunnel to the device or service via the probe application.

The invention also extends to a computer-readable medium containing instructions, which when executed on a computer, implement the method set forth above.

BRIEF DESCRIPTION OF THE DRAWINGS

The invention will now be described in more detail, by way of example only, with reference to the accompanying drawings, in which:-

DETAILED DESCRIPTION OF THE INVENTION

Figure 1:
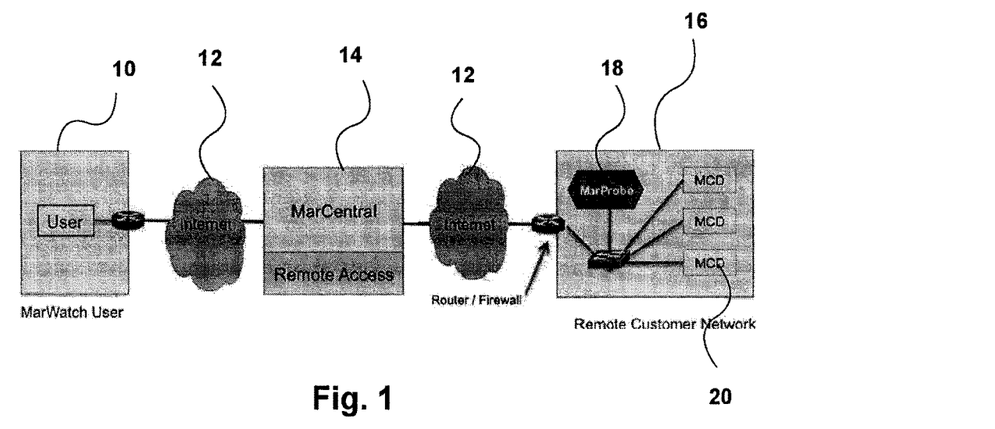
FIG. 1 shows the basic components of the system.

The basic architecture of the novel system is shown in FIG. 1. A user 10 communicates with a device 20 or service on a remote network 16 over the Internet 12 via a web page provided by a web server located on a central server 14, referred to herein as MarCentral.

The user may wish to access a device or service on the remote network 16. The system runs under a remote access application on the central server 14.

The invention is typically implemented as a third party service, where a service provider or valued added reseller offers a web page allowing a user to login and access a device on a specific network.

Figure 2:
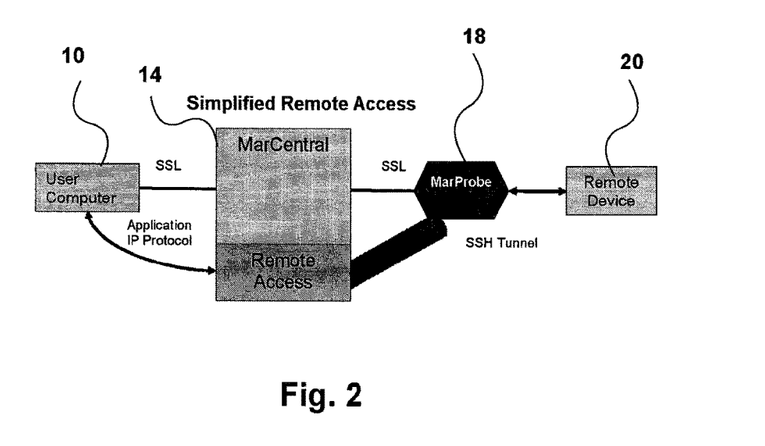
FIG. 2 shows the steps involved in setting up a remote connection.

FIG. 2 illustrates the process of establishing a connection from the user device to the remote device 20. A probe application, herein referred to as Marprobe 18, is installed on the network serving the remote device.

In order to establish a connection from the user computer 10 to the remote customer device 20, the following steps are performed:

1. The user 10 connects to the web portal using HTTPS. To initiate a remote access request the user clicks on a link for the supported remote device in the webportal or selects a remote IP address/port in a Gadget.
2. The system requests the MarProbe 18 to initiate an SSH connection to MarCentral 14.
3. The system returns a URL to the user's web browser which may direct it to initiate a specific IP protocol connection to MarCentral 14, using a specific IP address and port.
4. If the connection requested is a Web connection, an application provides a click-to-connect link in the webportal.
5. For other IP protocols, the connection is made by a helper application on the user's computer such as Putty or SSH.
6. The Remote Access portion of MarCentral 14 receives the session request from the user's computer and cross-connects it through the SSH link already established by the MarProbe 18.
7. The MarProbe 18 then forwards the user's IP protocol session through the SSH Tunnel to the remote customer device.

This is a novel application of SSH Tunneling because this is done with a reverse lookup. Generally, the output end of the SSH tunnel is created where the request originates. This process however does not allow for traffic to flow in the opposite direction. The simplified Remote Access combines the SSH tunnel creation process with our Remote Procedure Call (RPC) framework such that the request can be made within the customer network. The diagram below shows a simplified view of the remote access process.

For certain protocols such as telnet and FTP that are not secure in the connection between the User Computer 10 and central server 14 known as MarCentral, the Remote Access application has a local agent 118 that can be run on the User Computer through the web. The steps to establish a connection in this case are as follows:

1. Same as steps 1 and 2 above.
2. The system gives the user's web browser access to temporarily download and run the local agent without installing it onto the computer. The local agent already comes preconfigured with all the connection information.
3. The user is told to connect to a specified port on his computer using a specific IP protocol.
4. For non-web connections, the connection is made by a helper application on the user's computer.
5. The local agent receives the session request from the user's computer and cross-connects it through the SSH link already established with MarCentral 14. The Remote Access portion of MarCentral 14 receives the session request from the local and cross-connects it through the SSH link already established by the MarProbe 18.
6. The MarProbe 18 then forwards the user's IP protocol session through the SSH Tunnels to the remote customer device.

The net effect of these steps is to provide the equivalent of a direct connection between the user's computer and the remote network device. The user's computer establishes a session to either MarCentral 14 or through the local agent to MarCentral using whatever IP Application protocol is needed to connect to the remote device; the Remote Access application then tunnels this session to the MarProbe 18 which forwards to the remote device.

Since the local agent does not need to be installed onto the user's computer, the addition of the local agent adds a secure channel between the system application and the User Computer. This forms one secure tunnel between the user computer and the remote device.

It will be appreciated that although the invention has been described using an SSH tunnel, any protocol that provides authorization, encryption and multi-channel capability could be used instead.

Figure 3:
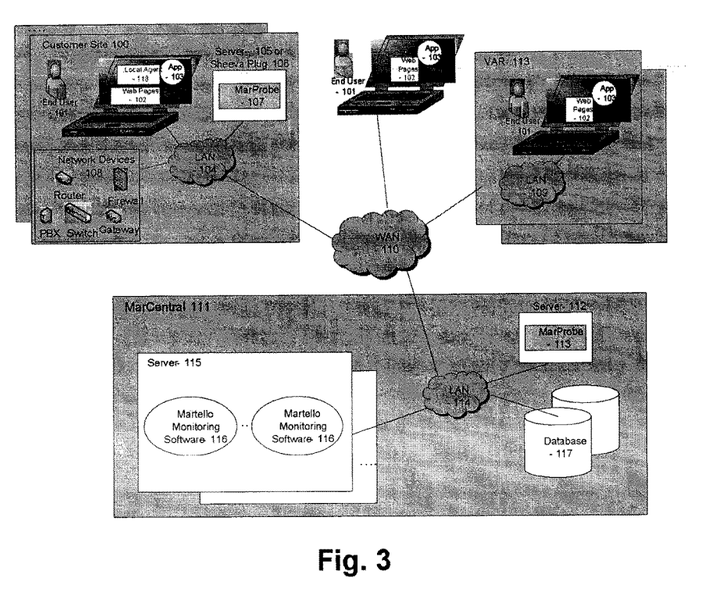
FIG. 3 is a more detailed block diagram of one embodiment of the system.

Referring now to FIG. 3, which shows a detailed example of a connection, an end user 101 interfaces with the central server 111 using web Pages 102 and an app 103 running on a client device connected to a LAN 104, 109 or the WAN 110. Web Pages 102 can include associated applets such as local agent 118, which can reside in the customer site 100, the VAR (Value Added Reseller) 113, or anywhere on the Internet.

On the customer Site 100, there is a server 105, which may be in the form of a SheevaPlug 106, running the probe software 107. The probe software 107 interfaces with the monitoring software module 116. Many network devices 108 connect to the LAN 104 are accessible to the probe Software 107. The LAN 104 and 109 are connected to WAN 110.

The central server 111 comprises servers 112 connected to the LAN 114, which can be running the probe software 107 for a customer, servers 115 connected to the LAN 114 running the Monitoring Software 116, and databases 117 connected to the LAN 114.

There is an instance of the monitoring software for each VAR (Value added reseller) 113, and this instance manages all the different VAR Customers probe applications 107. The LAN 114 is connected to the WAN 110. The VARs may provide access to customers as a service.

Figure 4:
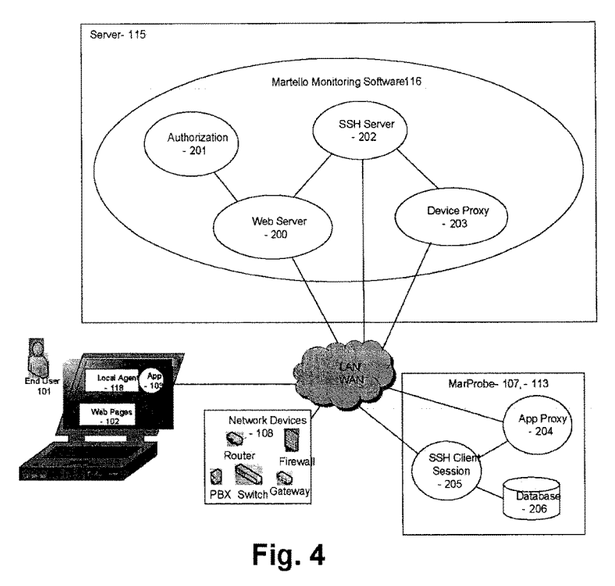
FIG. 4 is a view similar to FIG. 3 showing the monitoring software in more detail.

Referring now to FIG. 4, the Monitoring Software 116 can be further broken down into a number of components. A web server 200 serves up the web pages 102 and local agents 118 to the user and interfaces with them. A database access module 201, which accesses the Databases 117 to authorize Users 101 trying to access the system and retrieve information, such as mapping information between probe applications 107 and Network Devices 108. An SSH server 202 is responsible for setting up the SSH tunnel. A Device Proxy 203 represents a device 108 on the customer site.

The probe Software 107 comprises an SSH client session 205, which is the end point for an SSH Tunnel, an App proxy 204, which represents an application 103 in the probe application Software 107, and a database 206, which contains a list of Devices 108 that the probe application can access.

Figure 5:
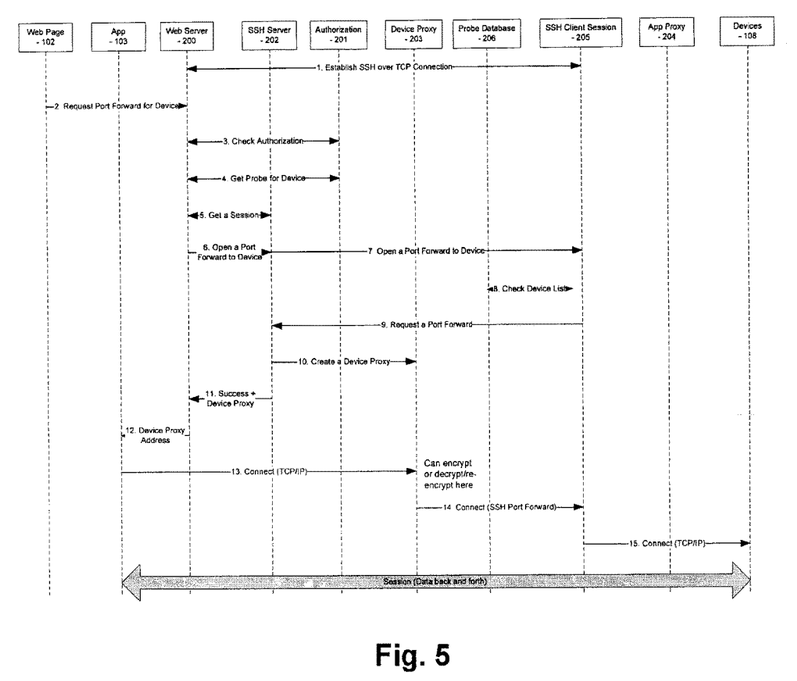
FIGS. 5-7 show the sequence of steps in setting up a connection at the central server.

FIG. 5 is a message sequence chart showing how a Server Initiated Port Forward is set up without using the local agent 118. This is a unique way of establishing a Port Forward operation. Step 1, at some point, an SSH tunnel over a TCP Connection is established in between the SSH Server 202 and the SSH Client Session 205. When a User 101 makes a request for a Port Forward to a Device 108, Step 2, a Request message is sent from the Web Page 102 to the Web Server 200. The Web Server 200 checks the User's 101 authorization (Step 3) using Database Access module 201. It then accesses the database (Step 4) through the Database Access Module 201 to retrieve the probe application that corresponds to the Device 108 that they want to access. Step 5 and 6, the Web Server 200 then asks the SSH Server 202 to create a new session to handle the request and to Open a Port Forward to the requested Device 108.

The SSH Server 202 then forwards this request over the SSH Tunnel to the SSH Client Session 205 on the correct probe application (Step 7). Step 8, the SSH Client Session checks the Probe Database 206 Device List to make sure the Device is Accessible. The SSH Client Session 205 then sends a Request for a Port Forward to the SSH Server 202 (Step 9). Steps 10 and 11, then SSH Server 202 creates a Device Proxy 203 and tells the Web Server 200 that the Open is complete and sends it the address of the Device Proxy 203.

In Step 12, the Web Server 200 passes the device proxy address to App 103. The App 103 then establishes a connection to the far device by sending a Connect over TCP/IP to the Device Proxy 203. At this point the Device Proxy 203 can encrypt the message, or decrypt it and re-encrypt it to provide greater security. It then sends the Connect over the SSH Tunnel to the SSH Client Session 205 (Step 14). Step 15, the SSH Client Session 205 send the Connect to the Device 108. At this point a Session is created and Data can flow back and forth between the App 103 and the Device 108.

Figure 6:
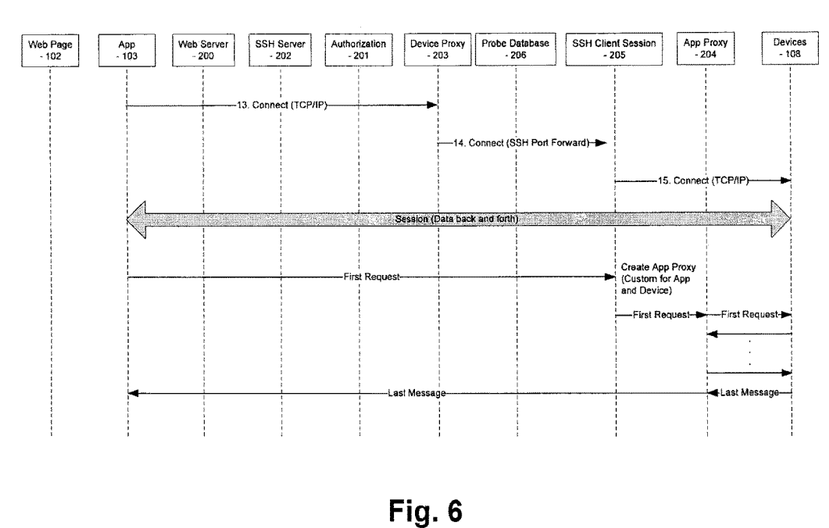

FIG. 6 shows a further improvement to the process in FIG. 5, which makes the performance of the system better. After Step 15, when the Session is established, the first Request made to the Device 108 can cause an App Proxy 204 to be created, and do work on behalf of the App 103. These are custom pieces of software made for the particular App and Device. Once the App Proxy 204 is created, the First Request is sent to it, which is passed on to the Device 108, but from this point on until the Last Message is sent, then App Proxy handles all the messages to and from the device, cutting down on the time it takes to process them. The Last Message is sent all the way back to the App 103 at which point the App Proxy 204 is destroyed.

Figure 7:
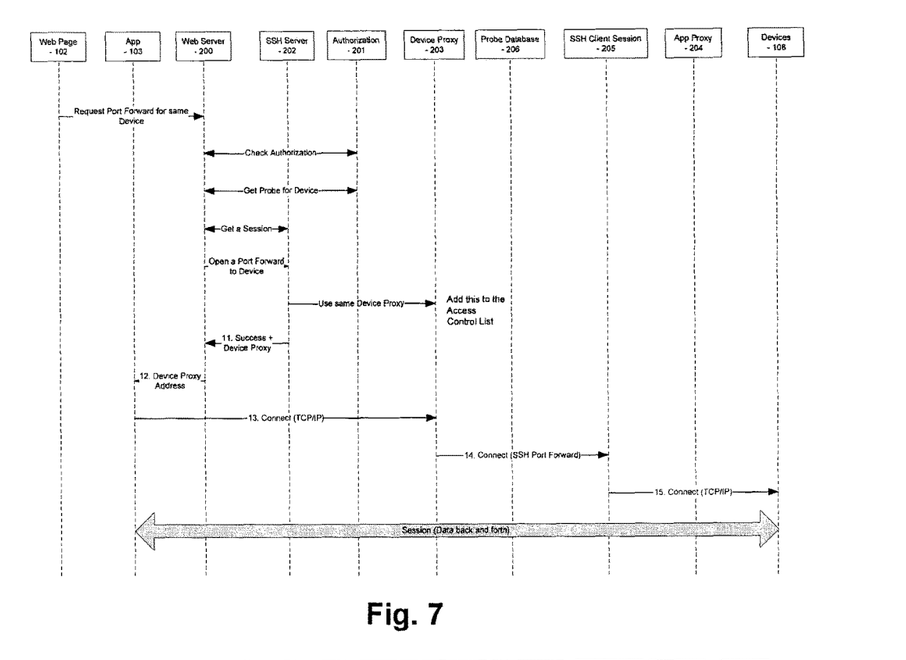

FIG. 7 shows what happens if a Request for a Port Forward is made for the same Device 108 as in FIG. 5. In this case, the Device Proxy already created is shared by the two Users 101. This means that Steps 7-10 in FIG. 5 are not necessary; the SSH Server uses the same Device Proxy 203, which has an Access Control List to keep track of the different sessions and enforce access rules.

Figure 8:
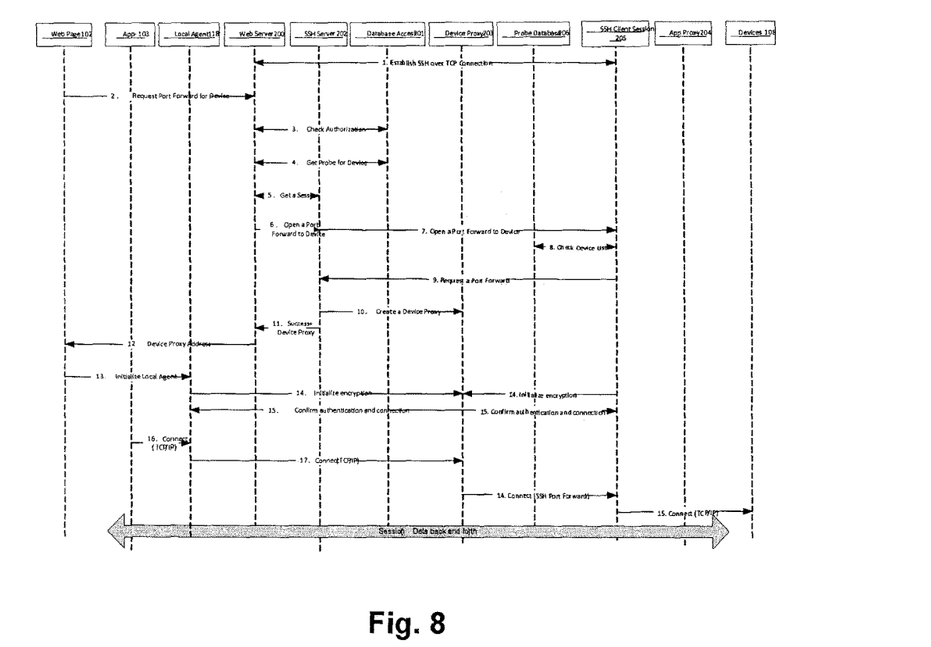
FIG. 8 shows the monitoring software.
Figure 9:
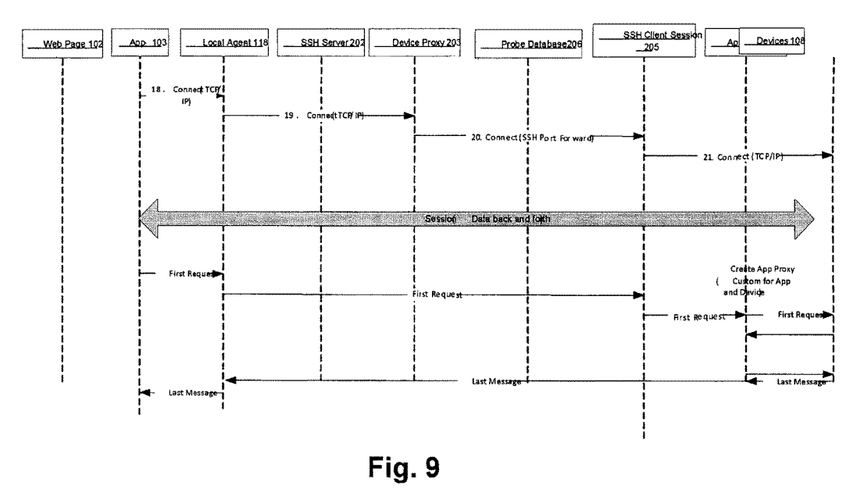
FIG. 9 shows the sequence of steps when a user clicks on a gadget.

While FIGS. 5 to 7 illustrate processes of Remote Access using SSH Tunneling, FIGS. 8 and 9 illustrate processes of Remote Access that includes the local Agent.

FIG. 8 is a message sequence chart showing how a Server Initiated Port Forward is set up using Local Agent 118. Steps 1 to 6 are identical to those in FIG. 5. Step 7, the SSH Server 202 generates an encryption key, authentication nonce and opens a port. SSH Server 202 then forwards the key, nonce and socket address along with the Port Forward request over the SSH Tunnel to the SSH Client Session 205 on the correct MarProbe. Steps 8 to 11 are the same as those in FIG. 5. It is suggest that the previous socket address be forwarded to the device proxy address from Device Proxy 203. Step 12, the SSH server 202 responds to the Web Page 102 with the encryption key, authentication nonce and device proxy address. In step 13, the Web Page 102 initializes the Local Agent 118 and passes in the key, nonce and device proxy address. The Local Agent 118 also opens a local port on the user computer. Step 14, Local Agent 118 and SSH Client session 205 connects to the socket address provided by Device Proxy and initialize encryption by passing their key and authentication nonce. In Step 15, the Device Proxy 203 intercepts and decrypts initial packets from SSH Client Session 205 and Local Agent 118 and matches them with the authentication nonce. Once the two parties are authenticated, Device Proxy 203 notifies SSH Client Session 205 and Local Agent 118 that they are now connected and authenticated. The Device Proxy 203 stops intercepting and decrypting data and starts passing the encrypted data between the two parties. In Step 16, the App 103 establishes a connection to the far device by sending a Connect over TCP/IP to Local Agent 118. The Local Agent 118 then forwards this to the Device Proxy 203 (Step 14). Step 17, the Device Proxy 203 sends the Connect to the SSH Client Session 205. Finally in Step 18, the SSH Client Session 205 send the Connect to the Device 108. At this point a Session is created and Data can flow back and forth between the App 103 and the Device 108.

FIG. 9 shows a further improvement to the process in FIG. 8, which makes the performance of the system better. After Step 17, when the Session is established, the first Request made to the Device 108 can cause an App Proxy 204 to be created, and do work on behalf of the App 103. These are custom pieces of software made for the particular App and Device. Once the App Proxy 204 is created, the First Request is sent to it, which is passed on to the Device 108, but from this point on until the Last Message is sent, then App Proxy handles all the messages to and from the device, cutting down on the time it takes to process them. The Last Message is sent all the way back to the App 103 at which point the App Proxy 204 is destroyed.

Figure 10:
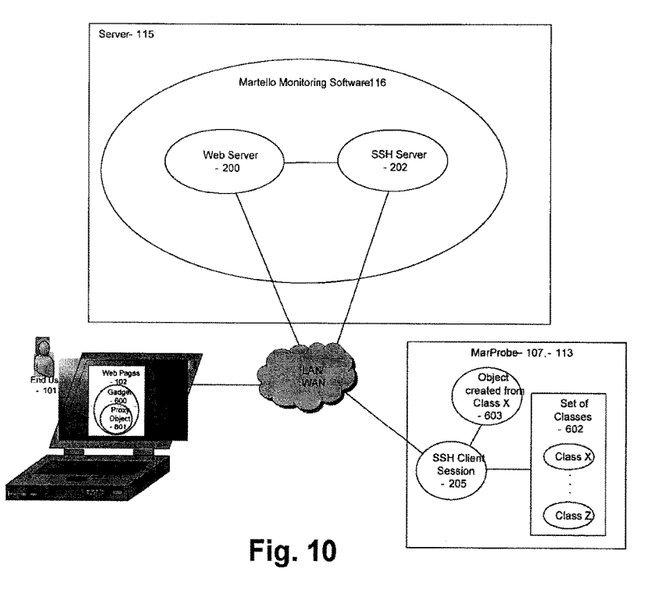
FIG. 10 is a view similar to FIG. 4 showing a system employing gadgets.

FIG. 10 contains the modules for a Remote procedure call (RPC) setup. This allows a User 101 to do RPC's on a Device from anywhere on the Internet, using the same SSH Tunnel as the Port Forwards. As shown in FIG. 10, the Web Pages 102 contain Gadgets 600, which create Proxy Objects 601. These Proxy Objects 601 represent Objects 603 created from a Set of Classes 602 associated with the SSH Client Session 205 in the probe Software 107. This is an example of one possible method of implementation. The key component is the ability to create instances of defined functionality behind the customer's firewall.

Figure 11:
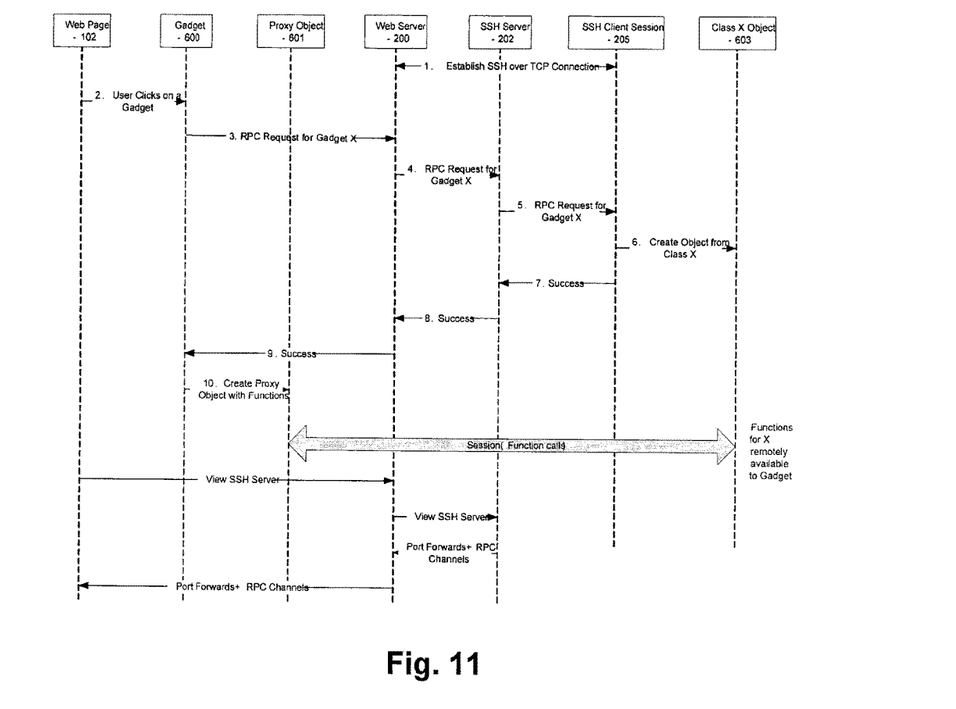
FIG. 11 shows the sequence of steps involved in setting up a connection using the system of FIG. 10.

FIG. 11 is the Message Sequence Chart of how these Proxy Objects are created. It is assumed that Step 1, the creation of an SSH over TCP Connection is done. On the Web Page 102, the User 101 "clicks" on a Gadget 600 embedded in the page (Step 2). When this occurs (step 3, 4, 5), the Gadget 600 sends an RPC Request for the particular Gadget to the Web Server 200, which passes it to the SSH Server 202, and on to the SSH Client Session 205. In Step 6, the SSH Client Session creates the particular Gadget X Object from Classes it has stored. Steps 7, 8 and 9, Success is passed back, and when it reaches Gadget 600, it creates a Proxy Object 601 (Step 10) which has all the functions that the Class provides, and are now available to the User through the Web Page 102. Once the RPC channels and Port Forwards are set up, the User 101 can view these sessions through the Web Page 102. Doing both of these at the same time over the same Session is unique.

Embodiments of the invention provide a number of key advantages. There is no need to configure firewall rules at either the Remote Site or the Reseller site. The system is configuration-free. There are no VPN clients used either at the user's PC or at the Remote Site. Different customers may prefer different VPN clients and in most cases these different VPN clients cannot co-exist or operate at the same time on the user's PC. Not using a VPN client means there is no chance of VPN client conflict. The Remote Access service allows multiple simultaneous connections from the user's PC to different remote sites. This is not possible using VPN technologies. The avoidance of VPN technology means it is not necessary to remember and secure many different User ID and Password combinations. The Remote Access service allows administrators to control and limit the devices you can connect to within the customer's network. These can also be changed on the fly and will be applied immediately. VPN simply links you to their network.

The Remote Access Service uses standard IP security mechanisms. The communication links are authenticated and encrypted. A security certificate is obtained from the Certificate Authority (CA) to authenticate all connection requests. SSL sessions to the central server are encrypted and authenticated. SSH sessions are encrypted and authenticated as well.

The system allows either a user to establish an access control list (ACL), which applies to all remote access sessions. For instance, the ACL could be set up to deny access to sensitive parts of the customer network and allow access only to specific devices and subnets. The Remote Access Gadget provides information on all active remote access sessions. All changes to the access control list take effect immediately for all connections.

The invention claimed is:

1. A method of providing secure user access to a device or service on a remote network, comprising:
   receiving a request to access the device or service on a portal on a central server which authenticates users and maintains a database mapping particular probe applications to accessible devices on a remote network;
   creating a device proxy on the central server which the user communicates with and which will communicate with the device or service on the remote network over a secure tunnel to a probe application;
   sending a request to the probe application installed on the remote network to establish a secure link to the central server;
   sending a message to the user directing the user to initiate a specific session request to the central server;
   cross connecting the session request to the probe application installed on the remote network over the secure link to establish the secure tunnel to the probe application;
   forwarding a secure user session through the secure tunnel to the device or service via the probe application; and
   the user is connected to the device using port forwarding which is established by a first process or a second process; wherein
   the first process establishes the port forwarding as follows:
      an SSH tunnel over a TCP Connection is established in between an SSH server on the central server and an SSH client session on the probe application;
      when the user generates a request to access the device a request message is sent from a user web page to the central server;
      the central server validates the user's authorization and retrieves the particular probe application corresponding to the requested device;
      the central server sends a request to the SSH Server to create a new session to handle the request and to open the port forward to the requested device;
      the SSH Server then forwards this request over the SSH tunnel to the SSH client session on the correct probe application;
      the SSH Client Session checks a database associated with the probe application to make sure the device is accessible;
      the SSH client session then sends a request for a port forward to the SSH Server;
      the SSH Server creates the device Proxy and notifies the web Server that the open port forward is complete and sends the open port forward and the address of the device proxy;
      the central server passes the device proxy address to an application associated with the user;
      the application associated with the user then establishes a connection to the remote device by sending a connect-over-TCP/IP request to the device proxy; and
      the device proxy then sends the connect request over the SSH tunnel to the SSH client session; and
      the SSH client session sends the connect request to the device to permit data to flow back and forth between the application associated with the user and the requested device; and
   the second process establishes the port forwarding as follows:
      an SSH tunnel over a TCP Connection is established in between an SSH server on the central server and an SSH client session on the probe application;
      when the user generates a request to access the device a request message is sent from a user web page to the central server;
      the central server validates the user's authorization and retrieves the particular probe application corresponding to the requested device;
      the central server sends a request to the SSH Server to create a new session to handle the request and to open the port forward to the requested device;
      the SSH Server then forwards this request over the SSH tunnel to the SSH client session on the correct probe application;
      the SSH Client Session checks a database associated with the probe application to make sure the device is accessible;
      the SSH client session then sends a request for a port forward to the SSH Server the SSH Server creates the device proxy and notifies the central Server that the open port forward is complete and sends the open port forward and the address of the device proxy;
      the central server passes the device proxy address to the web browser on the user computer;
      the web browser initiates the local agent with the device proxy address;
      the SSH client session connects to the device proxy address and initializes an encrypted connection;
      the local agent connects to the device proxy address and initializes an encrypted connection;

the device proxy authenticates the local agent and the SSH client session and facilitates the initialization of an encrypted connection between the local agent and the SSH client session;

the application associated with the user then establishes a connection to the remote device by sending a connect-over-TCP/IP request to the local agent;

the local agent then sends the connect request over the SSH tunnel; through the device proxy, to the SSH client session; and the SSH client session sends the connect request to the device to permit data to flow back and forth between the application associated with the user and the requested device.

2. The method according to claim 1, wherein the tunnel is established using a Secure Shell (SSH) protocol.

3. The method according to claim 1, wherein the portal is in the form of a web page accessible by the user.

4. The method according to claim 2, wherein at least one of:
the message sent to the user includes a click-to-connect link; and
the secure user session is a specific IP protocol connection.

5. The method according to claim 1, wherein a local agent is created on the local computer, the user communicates with the local agent, and the local agent communicates with the central server over the secure tunnel.

6. The method according to claim 1, wherein the device proxy encrypts and decrypts messages passing between it and the probe application.

7. The method according to claim 1, wherein
the web page contains gadgets that create proxy objects that represent objects created from a set of classes associated with a client session in the probe application to permit the user to perform a remote procedure call (RPC) setup on the device on the remote network; and in order to create a proxy object the user clicks on a gadget embedded in the page, the gadget sends an RPC Request for the particular gadget to the web server, which passes via to the SSH server the SSH client session, the SSH client session creates the particular Gadget X Object from classes it has stored, and a message is sent back to the user application, which creates a proxy object that has all the functions that the class provides, and are now available to the user through the web page.

8. A system for providing secure user access to a device or service on a remote network, comprising:
a central server comprising a database mapping particular probe applications to accessible devices on the remote network and providing a portal to receive a request to access the device or service and configured to:
create a device proxy, whereby the user communicates with the device proxy, and the device proxy communicates with the device on the remote network over the secure tunnel to the probe application;
send a request to a probe application installed on the remote network to establish a secure link to the central server;
send a message to the user directing the user to initiate a specific session to the central server;
cross connect the session request to the probe application installed on the remote network over the secure link to establish a secure tunnel to the probe application, forward a secure user session through the secure tunnel to the device or service via the probe application; and
user is connected to the device using port forwarding which is established by a first process or a second process; wherein the first process establishes the port forwarding as follows:
the SSH server establishes the SSH tunnel to an SSH Client Session on the probe application;
when the user generates a request to access the device the central server receives a request message from a user web page;
the central server validates the user's authorization and retrieves the particular probe application corresponding to the requested device;
the central server sends a request to the SSH Server to create a new session to handle the request and to open the port forward to the requested device;
the SSH Server then forwards this request over the SSH Tunnel to the SSH client session on the correct probe application;
the SSH Client Session checks a database associated with the probe application to make sure the device is accessible;
the SSH client session then sends a request for a Port Forward to the SSH Server;
the SSH Server creates the device proxy and notifies the central server that the open port forward is complete and sends the open port forward and the address of the device proxy;
the central server passes the device proxy address to an application associated with the user;
the application associated with the user then establishes a connection to the remote device by sending a connect-over-TCP/IP request to the device proxy;
the device proxy then sends the connect request over the SSH tunnel to the SSH client session; and
the SSH client session sends the connect request to the device to permit data to flow back and forth between the application associated with the user and the requested device; and the second process establishes the port forwarding as follows:
the SSH server establishes the SSH tunnel to an SSH Client Session on the probe application;
when the user generates a request to access the device the central server receives a request message from a user web page;
the central server validates the user's authorization and retrieves the particular probe application corresponding to the requested device;
the central server sends a request to the SSH Server to create a new session to handle the request and to open the port forward to the requested device;
the SSH Server then forwards this request over the SSH Tunnel to the SSH client session on the correct probe application;
the SSH Client Session checks a database associated with the probe application to make sure the device is accessible;
the SSH client session then sends a request for a Port Forward to the SSH Server;
the SSH Server creates the device proxy and notifies the central server that the open port forward is complete and sends the open port forward and the address of the device proxy;

the central server passes the device proxy address to the web browser on the user computer;

the web browser initiates the local agent with the device proxy address;

the SSH client session connects to the device proxy address and initializes an encrypted connection;

the local agent connects to the device proxy address and initializes an encrypted connection;

the device proxy authenticates the local agent and the SSH client session and facilitates the initialization of an encrypted connection between the local agent and the SSH client session;

the application associated with the user then establishes a connection to the remote device by sending a connect-over-TCP/IP request to the local agent;

the device proxy then sends the connect request over the SSH tunnel to the SSH client session; and the SSH client session sends the connect request to the device to permit data to flow back and forth between the application associated with the user and the requested device.

9. The method according to claim 8, wherein the tunnel is established using a Secure Shell (SSH) protocol.

10. The method according to claim 8, wherein the portal is in the form of a web page accessible by the user.

11. The method according to claim 9, wherein at least one of:

the message sent to the user includes a click-to-connect link; and the secure user session is a specific IP protocol connection.

12. The method according to claim 9, wherein the device proxy encrypts and decrypts messages passing between it and the probe application.

13. The method according to claim 8, wherein the web page contains gadgets that create proxy objects that represent objects created from a set of classes associated with a client session in the probe application to permit the user to perform a remote procedure call (RPC) setup on the device on the remote network.

14. A system for providing secure user access to a device or service on a remote network, comprising:

a central server comprising a database mapping particular probe applications to accessible devices on the remote network and providing a portal to receive a request to access the device or service and configured to:

create a device proxy, whereby the user communicates with the device proxy, and the device proxy communicates with the device on the remote network over the secure tunnel to the probe application;

send a request to a probe application installed on the remote network to establish a secure link to the central server;

send a message to the user directing the user to initiate a specific session to the central server;

cross connect the session request to the probe application installed on the remote network over the secure link to establish a secure tunnel to the probe application, and forward a secure user session through the secure tunnel to the device or service via the probe application; wherein the user is connected to the device using port forwarding;

an application proxy for the application associated with the user is created in the probe application upon receipt of a first request to the device, and wherein intervening messages between the application and the device are handled by the application proxy until the last message, which is sent back to the application associated with the user; and the system is configured such that in order to create a proxy object the user clicks on a gadget embedded in the page, the gadget sends an RPC Request for the particular Gadget to the web Server, which passes via to the SSH Server the SSH Client Session, the SSH client session creates the particular Gadget X Object from Classes it has stored, and a message is sent back to the user application, which creates a proxy object that has all the functions that the class provides, and are now available to the user through the web page.

15. The method according to claim 14, wherein the tunnel is established using a Secure Shell (SSH) protocol.

16. The method according to claim 14, wherein the portal is in the form of a web page accessible by the user.

17. The method according to claim 14, wherein at least one of:

the message sent to the user includes a click-to-connect link; and the secure user session is a specific IP protocol connection.

18. The method according to claim 14, wherein the web page contains gadgets that create proxy objects that represent objects created from a set of classes associated with a client session in the probe application to permit the user to perform a remote procedure call (RPC) setup on the device on the remote network.

* * * * *